Figure 1:
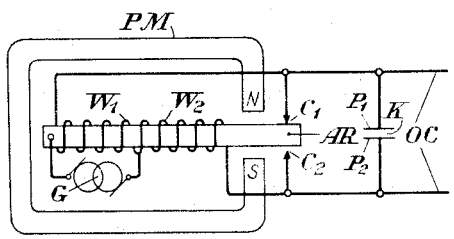

Aug. 28, 1945. J. B. DALY 2,383,777
SUB-HARMONIC GENERATOR
Filed Nov. 27, 1943

INVENTOR
J. B. Daly
BY Jefferson Ehrlich
ATTORNEY

Patented Aug. 28, 1945

2,383,777

UNITED STATES PATENT OFFICE 2,383,777

SUBHARMONIC GENERATOR

James Bernard Daly, Cleveland, Ohio, assignor to American Telephone and Telegraph Company, a corporation of New York Application November 27, 1943, Serial No. 512,057

15 Claims. (Cl. 172—281)

This invention relates to alternating circuits and systems. More particularly, this invention relates to alternating current generators and vibrators. Still more particularly this invention relates to apparatus for converting alternating current of one frequency into alternating current of a lower frequency. And still more particularly, this invention relates to sub-harmonic generators which employ a relay to produce the sub-harmonic currents.

This invention also relates to relays and to apparatus for testing relays. The relay apparatus of this invention may be employed for producing low frequency currents which may be suitable, for example, for energizing the windings of other relays so that the performance of these other relays may be observed.

Heretofore a source of alternating current was connected to the windings of certain types of relays to vibrate the armatures of these relays at a rate which corresponded to the frequency of the applied alternating current. During the positive half of the alternating current cycle the armature of each relay would close one of its contacts and during the negative half of the cycle the armature would close the other of its contacts. The relay of such arrangements comprised a means for converting the applied alternating current into mechanical vibrations of the relay armature occurring at the frequency of the applied current.

According to the present invention a source of alternating current is connected between the fixed terminal or base of the armature of the relay and the midpoint of the winding which may be wound upon the armature. The two terminals of the relay winding are connected to the two contacts which are positioned on opposite sides of the armature, these two contacts being also adjacent the two pole pieces of the permanent magnet of the relay. This arrangement will cause the relay armature to become polarized in one direction for an interval which is substantially equal to the period of one cycle of the applied alternating current and then polarized in the opposite direction for a like interval, and so on. The armature of the relay will close one of its two contacts throughout an interval corresponding to one cycle of the applied current and its other contact throughout an interval corresponding to the next cycle of the applied alternating current, and so on. The armature of the relay will thus vibrate at a rate which is one-half of the frequency of the applied alternating current. Moreover, a potential will be produced at the terminals of the relay winding of a frequency which is equal to one-half of the frequency of the applied current.

The arrangement just referred to may be considered a sub-harmonic generator or converter because it converts the applied alternating current into alternating current or mechanical vibrations of a frequency which is a sub-multiple of the applied alternating current. A plurality of such arrangements may be connected in tandem and adjusted so that the frequency of any applied alternating current will be reduced to any desired sub-multiple frequency.

Heretofore, relays of the 209 type were tested by changing the relative positions of the contacts of the armature and of the pole pieces and then observing the balance of the relay as it is physically moved into different positions in space. According to the present invention a predetermined low frequency alternating current obtained from the sub-harmonic generator apparatus referred to may be applied to the winding of a relay to be tested. An indicating circuit connected to the contacts of the armature of the relay to be tested may be employed to observe the performance of the latter relay.

Figure 2:
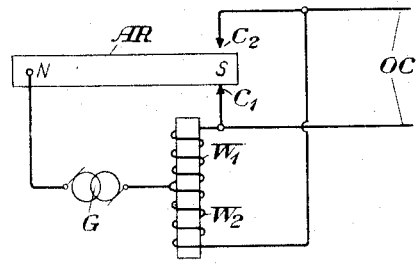
Figure 3:
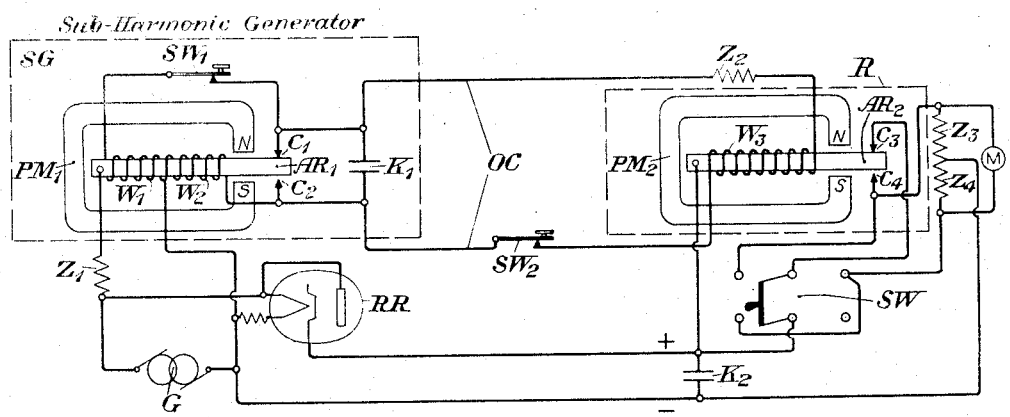
Figure 4:
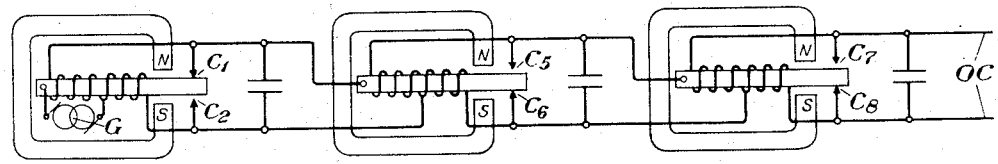

This invention will be better understood from the more detailed description hereinafter following, when read in connection with the accompanying drawing, in which Figures 1 and 2 illustrate relay circuits submitted to illustrate the invention in its general aspects; Fig. 3 shows one form of the apparatus of the invention applied to a system for testing relays; Fig. 4 illustrates generally a tandem arrangement of relay structures for producing currents of any desired sub-harmonic frequencies; and Fig. 5 shows a curve to be used in explaining the operation of the invention.

Referring to Fig. 1 of the drawing, there is shown a relay having a permanent magnet PM, an armature AR which may be moved between two contacts $C_1$ and $C_2$, and windings $W_1$ and $W_2$ which are wound in the same general direction about the armature AR. The windings $W_1$ and $W_2$ may be equal portions of the single operating winding of the relay. A generator of alternating current is connected between the terminal common to the windings $W_1$ and $W_2$ and the base of the armature AR as shown. The two contacts $C_1$ and $C_2$ are connected to an output circuit OC. A condenser K may be bridged across the two contacts $C_1$ and $C_2$. As will be described more fully hereinafter, the current of the generator G will cause the armature AR of the relay to vibrate at a sub-harmonic frequency which is one-half of the frequency of the current applied by generator G, and the output circuit OC will receive alternating current of this sub-harmonic frequency.

Figure 5:
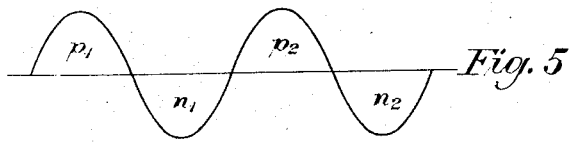

During the first positive half-cycle, that is, during the interval $p_1$ of Fig. 5, the current supplied by generator G will flow through the winding $W_1$ over a circuit which includes the right-hand terminal of generator G, the winding $W_1$, contact $C_1$, and back over the armature AR to the left-hand terminal of generator G. This current will produce a magnetic field in the armature AR, the north pole of which is at the right of armature AR and the south pole at its left. Under the influence of this superimposed magnetic field the armature AR will be moved to its lower contact $C_2$. During the second half-cycle of the applied current, that is, during the interval $n_1$ of Fig. 5, the direction of the current from generator G will, of course, be reversed and this current will traverse the winding $W_2$ of the relay. The circuit of winding $W_2$ will include the right-hand terminal of generator G, the winding $W_2$, contact $C_2$, and back through the armature AR to the left-hand terminal of generator G. The magnetic field produced in winding $W_2$ will be in the same direction as that caused by the first positive half-cycle $p_1$, and hence the armature AR will remain against contact $C_2$. Thus the magnetic field of the armature AR caused by the flow of current from generator G during the first complete cycle will produce a magnetic field in the armature which causes the armature to close its contact $C_2$ and remain closed against that contact during the rest of the cycle.

During the third half-cycle, that is, during the interval $p_2$, the current from generator G will be in a positive direction as in the first half-cycle $p_1$, and this current will traverse winding $W_2$ over a circuit which is the same as that referred to hereinabove for the second half-cycle designated $n_1$. The magnetic field produced by the coil $W_2$, however, will be in a reversed direction, that is, the south pole of the magnetic field will be at the right of armature AR and the north pole will be at its left. This will cause the armature AR to leave contact $C_2$ and close its upper contact $C_1$. During the fourth half-cycle, that is, during the interval $n_2$, current will flow from generator G through the winding $W_1$ in a direction opposite to that which energized the coil $W_1$ in the first half-cycle $p_1$. Consequently, the magnetic field established by winding $W_1$ will be the same as that established during the third half-cycle. In other words, during the fourth half-cycle the south pole of the magnetic field will be at the right of armature AR and the north pole at the left of the armature. The armature AR will therefore be held against its upper contact $C_1$ during the fourth half-cycle.

Thus the armature AR will be magnetized by the field in the relay windings in one direction during an interval which is substantially equal to the period of one complete cycle ($p_1+n_1$) of the applied alternating current, then in the opposite direction for a like interval ($p_2+n_2$) of the applied alternating current, then re-magnetized in the first-mentioned direction for the period of the next complete cycle, and so on. Under the influence of this changing magnetic field the armature AR will move between its contacts $C_1$ and $C_2$ at a rate which is equal to half of the frequency of the current applied by generator G. The changing magnetic field within the armature AR, which has been shown hereinabove to be poled in one direction for an interval of one cycle and poled in the opposite direction for a like interval, will cause current to flow through the coils $W_1$ and $W_2$ and through the output circuit OC. This current through circuit OC will have the sub-harmonic frequency, that is, it will have a frequency which is half of that of the generator G.

The effect of condenser K of Fig. 1 has not been considered so far. The arrangement of Fig. 1 without condenser K will produce current of half the frequency of generator G if the relay is of a slow-acting type. The time constant of the relay would have to be chosen so that the armature AR would close its contact $C_2$ near the end of the first half-cycle $p_1$, and later close its contact $C_1$ near the end of the third half-cycle $p_2$, and so on.

However, if the relay is of a quick-acting type, a condition may arise such that within a single half-cycle, such as $p_1$, two magnetic fields of opposite directions will be produced within armature AR at different times to drive the armature AR first to one contact such as $C_2$ and then to its other contact $C_1$. The first of these magnetic fields will be produced by current from generator G traversing winding $W_1$ when armature AR closes contact $C_1$ and the second of these magnetic fields will be produced by current from generator G traversing winding $W_2$ when armature AR closes contact $C_2$. A similar series of two (or more) excursions will be made by armature AR during each succeeding half-cycle. Such a fast-acting relay arrangement constitutes a harmonic generator capable of producing current of a frequency which is an integral multiple of that of generator G.

The addition of condenser K to a quick-acting relay device, however, will render the arrangement a sub-harmonic producer as will now be explained.

Assume that the armature AR is resting against contact $C_1$ at the beginning of the first positive half-cycle $p_1$. At the beginning of the first half-cycle $p_1$, the current of generator G will flow over two paths, one path including coil $W_1$, contact $C_1$, and armature AR and the other path including coil $W_2$, condenser K, contact $C_1$ and armature AR. These currents through coils $W_1$ and $W_2$ will produce mutually opposing magnetic fields which act simultaneously within armature AR. Thence the movement of the armature AR to contact $C_2$ under the influence of the current in coil $W_1$ will be delayed by the current through coil $W_2$ which charges the plate $P_2$ of condenser K to a positive potential with respect to the condenser plate $P_1$. The retarding influence of the latter current will be reduced as the condenser charge is increased. Later in the half-cycle $p_1$ when the condenser K is more fully charged, the retarding influence of the current in coil $W_2$ will be considerably reduced and hence armature AR will leave its contact $C_1$.

While the armature AR is "in the air," the condenser K will start to discharge through coils $W_2$ and $W_1$ in series. The magnetic field produced by this discharge current will be poled so as to hasten the movement of armature AR to its contact $C_2$. If the armature AR lands on contact $C_2$ before the end of the first positive half-cycle $p_1$, current from generator G will traverse winding $W_2$ tending to return the armature AR to its contact $C_1$. However, the condenser K will continue to discharge through coil $W_1$ over a circuit which includes condenser K, contact $C_2$, armature AR, generator G, and coil $W_1$ and the magnetic effect of this current through coil $W_1$ will overcome the effect of the current traversing coil $W_2$. The armature AR will therefore be held on its contact $C_2$ during the remainder of the first positive half-cycle $p_1$.

During the second half-cycle $n_1$, the reversal of the current through coil $W_2$ will produce a magnetic field acting to hold the armature AR on contact $C_2$, as already explained. At the same time generator G will transmit current to condenser K to increase its charge, the charging circuit including generator G, armature AR, contact $C_2$, condenser K and coil $W_1$. The condenser K will be charged in the same direction as before. Moreover, the flow of charging current through coil $W_1$ will produce a magnetic field to oppose the field of coil $W_2$, but the latter field will predominate and thereby hold armature AR on contact $C_2$.

At the beginning of the third half-cycle $p_2$, the generator G and condenser K will be poled in series aiding relation and their combined voltage will drive current through coil $W_1$ over the circuit including generator G, coil $W_1$, condenser K, contact $C_2$, and armature AR. This current through coil $W_1$ will produce a magnetic effect to oppose that of coil $W_2$ and hence act to hold armature AR on its contact $C_2$. But the magnitude of the current through coil $W_1$ will decrease as the charge on condenser K becomes reduced. After condenser K has become fully discharged and has started recharging in the opposite direction to render the plate $P_1$ positive with respect to plate $P_2$, the current from generator G through coil $W_2$ will exceed the charging current through coil $W_1$. Consequently the armature AR will move toward its contact $C_1$. The effect of the current flowing to condenser K will be to retard the movement of armature AR to contact $C_1$ until late in the positive half-cycle $p_2$.

While the armature AR is traveling from contact $C_2$ to contact $C_1$ during the third half-cycle $p_2$, the condenser K will discharge through coils $W_1$ and $W_2$ in series. The magnetic field produced by this discharge current will be poled so as to accelerate the movement of armature AR to contact $C_1$. Should the armature AR reach contact $C_1$ before the end of the third half-cycle $p_2$, two mutually opposing magnetic fields will again be set up within armature AR. One of the currents producing one of these fields, will flow from generator G through coil $W_1$, but this current will be of a small magnitude. The small magnetic field due to this current will tend to return armature AR to contact $C_2$. The other current producing the opposing field will be due to the discharge of condenser K through coil $W_2$ over the circuit including condenser K, contact $C_1$, generator G, and coil $W_2$. The magnetic field due to this current will overcome the field due to coil $W_1$ and hence the armature AR will be held on its contact $C_1$ during the remainder of the half-cycle $p_2$.

During the fourth half-cycle $n_2$, current will flow from generator G through coil $W_1$. This current will act to hold armature AR against its contact $C_1$. Current will also flow from generator G to recharge condenser K, the charging circuit including generator G, armature AR, contact $C_1$, condenser K and coil $W_2$. The latter current, however, will be smaller than that traversing $W_1$ and therefore the armature position will be unaffected by the current in coil $W_2$.

This same series of steps will recur during succeeding cycles. The net magnetic field within armature AR will cause a sub-harmonic current to flow to the output circuit OC.

Fig. 2 shows a somewhat different arrangement which may be employed for this same purpose. Here the armature AR is a permanent magnet, the right-hand end of which is movable between contacts $C_1$ and $C_2$, and its left-hand end is fixed. The coils $W_1$ and $W_2$ are wound in the same direction but their core may be made either of non-magnetic material or of soft iron of but small residual magnetism. The generator G is here also connected between the fixed left-hand terminal or base of the armature AR and the terminal common to coils $W_1$ and $W_2$ as shown.

In the arrangement of Fig. 2, during the first positive half-cycle $p_1$ of the applied current from generator G, current will traverse the coil $W_1$ over a circuit which includes generator G, the coil $W_1$, contact $C_1$, and the armature AR. This current will establish a magnetic field within the coil $W_1$, the south pole of which is at the upper end of the core and its north pole at the lower end of the core. Consequently, the armature AR will be moved to its upper contact $C_2$. During the second half-cycle $n_1$, the current from the generator G is reversed and this current will traverse the coil $W_2$ over a circuit which includes generator G, armature AR, contact $C_2$ and coil $W_2$. This current will establish a magnetic field within the coil which is in the same direction as that during the first or positive half-cycle $p_1$. The armature AR will, therefore, be held against its upper contact $C_2$. During the third half-cycle $p_2$, current will again traverse the coil $W_2$ but its direction will be again reversed, thereby reversing the magnetic field within the core of the coil $W_2$. The north pole of the magnetic field will therefore be at the upper end of the core and its south pole at the lower end of the core. The armature AR will now be moved to its lower contact $C_1$. During the fourth half-cycle $n_2$, current will flow through the coil $W_1$. The magnetic field within the coil will be in the same direction as that in the third half-cycle and hence the armature AR will be held against its contact $C_1$. Thus the field within coils $W_1$ and $W_2$ will be in one direction during the interval of one complete cycle and in the opposite direction during the interval of the next complete cycle, and so on. The armature will thus vibrate at half the frequency of the generator G and the current flowing in the output circuit OC will also be of half the frequency of the generator.

The arrangements of Figs. 1 and 2 are set forth in general terms to illustrate broadly the principles of this invention. It will be apparent that the windings and magnetic structures must be properly proportioned for the most efficient operation. The arrangements described may be modified to provide either a harmonic generator or a sub-harmonic generator. The theory of operation of the apparatus of the invention has been submitted merely to explain the functioning of the apparatus and, whether correct or incorrect, should not be construed so as to limit the invention in any way.

Fig. 3 shows the sub-harmonic generator of Fig. 1 applied to an arrangement for testing a relay R which may be of the 209 or 215 type. Here the permanent magnet $PM_1$, the armature $AR_1$ and its contacts $C_1$ and $C_2$, together with the coils $W_1$ and $W_2$ and condenser $K_1$, correspond to like elements of Fig. 1, and they comprise the basic sub-harmonic generator SG for converting the alternating current of generator G into current of half the frequency of the generator G. A resistor $Z_1$ is interposed in series with the generator G for controlling the flow of current therefrom. A key $SW_1$ may be closed to operate the sub-harmonic generator SG whenever desired. The output circuit OC of the sub-harmonic generator SG is connected to the coil $W_3$ of relay R by a resistor $Z_2$ and a key $SW_2$. The coil $W_3$ of relay R will receive the sub-harmonic current derived from the sub-harmonic generator SG to operate the relay R. The armature $AR_2$ of relay R will move back and forth between its contacts $C_3$ and $C_4$ at a rate which is half of that of the generator G.

Resistors $Z_3$ and $Z_4$ are equal resistors and are connected in circuit with a meter M for observing the performance of relay R. The alternating current of generator G is rectified by rectifier RR and supplies rectified current to the measuring apparatus. The double-poled, double-thrown switch SW may be operated for testing either the bias of relay R or the closure of the contacts of its armature, as will be explained hereinafter.

When switch SW is moved to the right, the resistors $Z_3$ and $Z_4$ will be connected in series with each other across the armature contacts $C_3$ and $C_4$ of relay R. The pointer of meter M will be moved from its normal position by an amount which corresponds to the bias of the relay R. However, if the relay R is unbiased, the pointer of meter M will remain undeflected. The bias may be corrected by adjustment of the relative positions of the pole pieces or of the armature contacts $C_3$ and $C_4$ of relay R in a well-known manner.

When the switch SW is thrown to the left, the contacts $C_3$ and $C_4$ of relay R will be connected to each other through the upper blade of switch SW. The resistors $Z_3$ and $Z_4$ will be connected in series with each other between the two interconnected contacts $C_3$ and $C_4$ of relay R and the fixed terminal of the armature $AR_2$ through the lower blade of switch SW. In this position of switch SW rectified current will flow through the resistors $Z_3$ and $Z_4$ only when the armature $AR_2$ closes either of the contacts $C_3$ or $C_4$ and meter M will register this condition. That is, rectified current will traverse resistor $Z_3$ when armature $AR_2$ closes contact $C_4$ and rectified current will traverse resistor $Z_4$ when armature $AR_2$ closes contact $C_3$. The key $SW_2$ is interposed between the sub-harmonic generator SG and the winding $W_3$ of relay R for the purpose of disconnecting the relay R from the sub-harmonic generator SG whenever mechanical adjustments of relay R are to be made.

An arrangement such as shown in Fig. 3 was set up to investigate the operation of the system. The relay of the sub-harmonic generator SG was of the 215 type and it received current from generator G, which was of 110 volts and of a frequency of 60 cycles. The resistor $Z_1$ was of 3,000 ohm value and the condenser $K_1$ was of 8 mf. capacity. The resistor $Z_2$ was of a 200 ohm value. The relay R under test was of the 209 or 215 type. It will be understood that the rectifier RR may be omitted if desired, in which case a source of direct voltage of any well-known type may be used instead of the rectifier.

The arrangement forms a simple portable equipment which can convert the usual 60 cycle commercial power supply into current of reduced frequency. The arrangement provides a source of low frequency current for testing or operating relays and other devices at a frequency more nearly equal to that at which such devices are normally operated. The arrangement is especially suitable at places where no current of 30 cycles or less is available.

Fig. 4 illustrates three sub-harmonic generators connected in tandem for converting the current of the generator G into current of a predetermined sub-harmonic frequency of the current of generator G. The first sub-harmonic generator will halve the frequency of the applied current of generator G and each subsequent sub-harmonic generator will in turn halve the frequency of the applied current received by it. If three sub-harmonic generators are interconnected as shown in Fig. 4, the output circuit OC will receive current of a frequency which is one-eighth of that of generator G. The armatures of the separate sub-harmonic generators will, of course, vibrate at corresponding sub-harmonic frequencies.

Although the constants of the arrangement of Fig. 3 have been given hereinabove, it will be apparent that other constants may be assigned to the elements in the practice of the invention. The elements may be proportioned so as to convert current of any frequency into current of a predetermined sub-harmonic value.

Although the relay arrangement of the invention has been described as involving a permanent magnet $PM_1$ it will be understood that an electromagnet including a coil of wire and a source of current connected thereto may be employed in place of the permanent magnet.

While this invention has been shown and described in certain particular embodiments merely for the purpose of illustration, it will be understood that the general principles of this invention may be applied to other and widely varied organizations without departing from the spirit of the invention as defined in the appended claims.

What is claimed is:

1. A sub-harmonic generator comprising a permanently magnetized structure, an armature fixed at one end and movable between two contacts at its other end, the movable end of said armature being positioned in the field of said structure, a coil of wire wound upon said armature and connected between said contacts, and a source of alternating voltage connected between the fixed end of said armature and the midpoint of said coil.

2. A sub-harmonic generator comprising a permanent magnet, an electromagnet having a core which is fixed at one end and movable between two contacts within the field of said permanent magnet, the coil of said electro-magnet being connected between said contacts, and a source of alternating current connected between the fixed end of said armature and the midpoint of said coil.

3. A sub-harmonic generator comprising a magnetic element which is fixed at one end and movable between two contacts at the other end, a coil of wire connected between said two contacts within the field of said magnetic element, and an alternating current generator connected between the fixed end of said magnetic element and the mid-point of said coil of wire.

4. A sub-harmonic generator comprising an elongated magnetic element which is fixed at one end and movable between two contacts at its other end, a coil of wire adjacent said magnetic element and connected between said contacts, a condenser also connected between said contacts, and a generator of alternating current connected between the fixed end of said magnetic element and the midpoint of said coil of wire.

5. A sub-harmonic generator comprising an elongated magnetic element fixed at one end and movable between two contacts at the other end, a permanently magnetized structure having its poles positioned on opposite sides of said elongated element, a condenser, a coil of wire wound upon said elongated element and connected in parallel with said condenser between said two contacts, and an alternating current generator connected between the fixed end of said elongated element and the mid-point of said coil of wire.

6. Apparatus for reducing the frequency of current to half its value, comprising an input circuit in which said current flows, a polar relay the winding of which is connected between the two contacts between which the relay armature may move, the input circuit being connected between the relay armature and a point on said winding substantially midway between its terminals, the output circuit being connected to said two contacts.

7. A sub-harmonic producer comprising a polar relay, a condenser bridged across the winding of said relay and across the contacts between which the relay armature may move, and a source of alternating current connected between the relay armature and a point along said winding.

8. In a sub-harmonic generator, the combination of a polar relay, a source of alternating current for energizing the relay winding, means for reversing the magnetic field of said relay winding only during each alternate cycle of current obtained from said source, and a load connected to said relay winding operating in response to the sub-harmonic current.

9. A sub-harmonic generator comprising a polar relay having a winding which is divided into two parts, a source of alternating current connected to said relay winding, and means for energizing one part of said relay winding during successive odd-numbered cycles of said source and for energizing the other part of said relay winding during successive even-numbered cycles of said source, the relay armature moving between its contacts at a rate which is half the frequency of said alternating current.

10. Means for obtaining current of one-half the frequency of a source of alternating current, comprising a polar relay, means for establishing a magnetic field in the winding of said relay in one direction during successive odd-numbered cycles of said source of alternating current, means for establishing a magnetic field in said relay winding in the opposite direction during successive even-numbered cycles of the current of said source, and a circuit for utilizing the current produced by the changes in direction of said magnetic field.

11. The method of deriving low frequency current from current of higher frequency with a polar relay, which consists in applying the higher frequency current to the winding of the relay so as to change the polarity of the magnetic field in the relay winding at a rate which corresponds to said low frequency and producing current of a frequency corresponding to the polarity changes of said magnetic field.

12. The method of converting alternating current of fundamental frequency into alternating current of half of said frequency with a slow-acting relay, which consists in applying the current of fundamental frequency to the relay winding for producing a magnetic field which changes in polarity at the rate of said half frequency, and producing current of said half frequency from the polarity changes of said magnetic field.

13. The combination of a source of alternating current, a coil of wire divided into two portions, and means for alternately transmitting current from said source through said two portions of said coil so as to produce a magnetic field therein in one direction during each odd-numbered cycle of current and for reversing the direction of said magnetic field during each even-numbered cycle.

14. The combination of a source of alternating current, means for producing a magnetic field polarized in one direction during successive odd-numbered cycles of said source of current, means for producing a magnetic field polarized in the opposite direction during successive even numbered cycles of said source of current, and means controlled by said magnetic fields to produce current of half the frequency of said source.

15. The combination of a source of alternating current, means for producing a magnetic field, means for polarizing said magnetic field in one direction during successive odd-numbered cycles of said current, means for polarizing said magnetic field in the opposite direction during successive even-numbered cycles of said current, and means controlled by the changing magnetic field for producing another alternating current of different frequency.

JAMES BERNARD DALY.